United States Patent Office 2,914,404

Patented Nov. 24, 1959

2,914,404

METHOD OF PRODUCING TWO-DIMENSIONAL CIRCUITS OR CIRCUIT ELEMENTS ON SUPPORTING BASES

Werner Fanselau and Sylke Carstensen, Hildesheim, Germany, assignors to Blaupunkt-Werke, G.m.b.H., Hildesheim, Germany No Drawing. Application July 31, 1953
Serial No. 371,734

3 Claims. (Cl. 96—35)

The object of the present method is to produce two-dimensional circuits or individual circuit elements on suitable supporting bases. There have already been proposed a large number of methods and individual method steps by means of which the production of such pictorial circuits or circuit elements, which are generally called "printed" is claimed to be possible.

However, true printing processes are employed in only a very few number of cases. In connection with all the previously-known so-called printed circuits, the essential fact was merely that they were present in two-dimensional forms in or on the plane of the support. Thus, for instance, supports were molded or extruded from thermoplastic materials into which the desired circuit was impressed in relief in the form of recessed lines. These supports were thereupon metallized over their entire surface and thereupon ground down to such an extent that only the depressed conductive paths retained their metallic surface coating. Such a manner of procedure requires a considerable expenditure for equipment and tools so that the operation is profitable only when there are produced a number of pieces which is so great as to scarcely be possible in actual operation. Another method which has found relatively wide use is the stencil printing method. In this method, the circuit which is to be printed is copied onto a fine-mesh silk gauze, wire netting or the like. For this purpose, the surfaces of the gauze are covered with a photo-sensitive copying emulsion, for instance gelatin. After these emulsions have dried, they are exposed to light through a master copy bearing the negative image of the circuit and then developed, whereby, as is well known, the exposed parts of the surface remain undissolved while the unexposed places are dissolved away. There is thus produced on the pieces of gauze or netting which are tightly clamped on a frame with elastic resiliency a kind of stencil through which suitable printing pastes, for instance silver paste, can be printed or sprayed onto the subjacent base plates with precisely-defined pressure. Aside from the fact that this method requires a certain amount of experience and practice, it is very difficult to regulate the pressure with which the pastes are forced through the net stencil so accurately that the areas printed therewith can be reproduced with sufficient accuracy in connection with their dimensions, as is required by the very narrow tolerances generally required, for instance in connection with the surfaces of condenser coatings.

In the method in accordance with the present invention, a photo-mechanical copying process is also used. However, the desired circuits of circuit elements are copied directly onto the supporting plates.

In accordance with the present invention, only the copying coating is applied to the support and the relief image obtained from this coating after its exposure and development itself becomes the functional coating, i.e. it itself forms the circuits or circuit elements. Accordingly, the copying coating is provided with additional materials which make it able to exercise the different functions of circuits or circuit elements. Therefore, it is either provided, from the very start, with these additions which will be discussed further below or else the areas which remain after the development and which correspond to the image of the circuits take up these addition materials as a result of the most varied types of subsequent treatments. If the developed relief image is therefore to have metallic conductivity, the initial copying solution can be pigmented with fine metallic powder. However, in the same manner, it is also possible to bathe the already-developed relief picture subsequently in two consecutive different solutions. In this connection, the coating first of all, for instance, takes up silver nitrate by swelling and diffusion. If it is then dipped into an alkali carbonate solution, silver carbonate precipitates and completely permeates the swollen layers. After drying, the plate can be heated until the carbonate has been reduced to metallic silver. It has been found very useful to treat the plates after the impregnation in the silver nitrate with a strong reducing agent, for instance to dip them in hydrazene or its derivatives, such as phenyl hydrazene in aqueous or alcoholic solution. In this way, there is such a complete reduction to silver that the layer already has a relatively good conductivity after the drying. This fundamental method of operation, namely the prior addition of materials to the copying solution followed by the introduction of addition materials by subsequent treatment, or the combination of both measures, permits of an extremely large number of variations which will be discussed in further detail below and the selection of which depends upon whether the circuit elements to be produced are to be good or poor conductors or semi-conductors or have dielectric, magnetic or other properties.

It has been found that it is advantageous to make the copying layer the functional layer in this manner rather than employing a method in which the copying layer and thus the copying relief picture lies in the form of a stencil on a previously-produced functional layer arranged below it, inasmuch as it is not necessary thereupon to effect any operation which also "develops" the functional layer, i.e. etches or dissolves the functional layer out of the exposed areas. Such a process has the disadvantage that the etching agent or solvent easily penetrates laterally below the masking relief picture, especially in case of narrow areas, thin lines or the like and attacks the functional layer also at those places where it should remain. This faulty condition frequently leads to defects in the circuit. In addition to this, the circuit elements remaining at the completion of the development of the functional layer, for instance conductive lines, are still covered with the copying layer which has been hardened by the exposure and are therefore insulated at their top. Inasmuch, however, as the bare metal surface is used predominantly for the following contactings, the copying layer must be removed. In this connection, however, the functional layer is again easily damaged. All in all, there prevails in this method a tendency towards destroying the functional layer or at least removing it.

In the method of the percent invention, on the other hand, the relief image which at the same time is the functional layer is not endangered by being washed away from below or corroded from the side by the etching agent or solvent. These layers, therefore, have a considerably greater adherence to their supporting bases. The layer is imparted further strength by the subsequent installation of the function-determining material. Therefore, a stabilizing building tendency prevails. A further advantage of the method, in particular as compared with the stencil printing method, consists of the fact that the layer thickness of the copying layer, which is determined by the maintenance of uniform concentrations and temperatures, can be kept very constant and reproducible when centrifuging in accordance with the method generally customary in the graphic arts. In addition, however, all functional values obtained by the previous addition of the addition materials or the subsequent treatments, such as conductivity, resistances, dielectric constants and the like, can be reproduced within narrow tolerances in a uniformity such as was not possible with other methods.

As already stated, the copied relief images are first of all made capable of exercising their different functions in the manner that the most varied types of pigments are added to the copying layers. There enter into question in this connection for the production of conductive layers, the metals silver, copper, iron, nickel, cobalt or any other metal, for instance in the form of a very finely-divided powder. For the production of resistance layers pigmentation with finely-divided carbon, such as carbon black or graphite or by carbides is advisable while, in connection with layers with semi-conductive properties, oxides or oxide mixtures enter into consideration. As pigments, there can also be used complex oxide compounds such as ferrites or manganites or the like if their magnetic properties are to be utilized for instance for shielding purposes. Furthermore, in general, there can be added salts or any compounds of the said metals or other metals, particularly if they are insoluble or soluble only with difficulty in water, even if, by themselves, alone, they do not impart any functional properties to the layers but are added for the purpose of having these addition substances react as a result of subsequent after-treatments to give function-determining final products.

For the preparation of insulating layers of specific pictorial extent, for instance for intersections of conductive paths which are to be insulated with respect to each other, or as dielectrics for condensers there enter into question as additions for the initial copying solution a large number of materials such as ground glass, mica, kaolin, bentonite, feldspar, talcum, aluminum oxide, magnesium oxide or similar non-conductive materials. If, for instance, dielectrics having a high dielectric constant are to be produced, titanium or zirconium compounds should be added.

In general, there applies to all pigments the requirement that they be added in an extremely fine state of division and at the very least as a very fine powder or, still better, as a colloidally-dispersed suspension or emulsion. To reach this goal, it is advisable, under certain circumstances, to grind the coating base materials such as gelatin, together with the addition materials or even to subject them jointly to ultrasonic treament in order to arrive at finely-dispersed suspensions.

As already mentioned, the introduction of some materials is effected for the purpose of having them become effective only during the subsequent treatment. In this connection, the addition of adsorptive silica, and especially therefore colloidal silica, has proven very advantageous as it is capable of favoring the penetration of further addition materials or of reaction components during the subsequent treatments. In the same way, the prior addition of insoluble or only difficultly soluble reduction or oxidation agents may be advisable.

With regard to the initial coating material itself, it may be stated that a large number of organic natural or artificial colloids or solutions can be made photo-sensitive by sensitizers. These sensitizers are, in general, the bichromates of potassium, sodium or ammonium. In special cases, the use of the bichromates of the other alkali metals can be advantageous. There also enter into question, however, as sensitizers, a large number of high molecular diazo compounds. Among substances which can be made photo-sensitive in this way, there are traditionally known albumen, fish glue, gelatin, dextrin, gum arabic and others. Recently, aqueous emulsions of polyvinyl alcohol have found preferred application. It is very important, in this connection, that also the aqueous emulsions of many plastics such as polyvinyl chloride, polyvinyl acetate, polystyrene, methacrylic acid derivatives and others can be made photo-sensitive by the said sensitizers and can thus be made suitable for use in accordance with the present method. The same is also true of aqueous emulsions of Bakelite resins and, in particular, of silicones. Very useful coating materials are also given by aqueous emulsions of cellulose, nitrocellulose, acetylcellulose and similar materials.

As is well known, it is within the basic photo-mechanical principle used here that the said coating materials are made insoluble in their specific solvent at the exposed places by the chromic acid formed from the bichromates and, in any event, retain a residual swelling power. It is, to be sure, advisable to use the said basic materials in the form of aqueous emulsions inasmuch as the solutions of the bichromates can be most conveniently added in this form. However, the said macromolecular substances can also be used as solution in the organic solvents corresponding to them, and therefore, for instance, in the form of lacquers. In these cases, the sensitizing is advisedly effected by bathing the pre-dried copying layers in solutions of the sensitizers which do not have any dissolving action on the layers but only a swelling action. In special cases, the sensitizing can also be produced by applying the sensitizers to the copying layers by evaporation, spraying or sputtering. In this connection, it is immaterial whether the sensitizers are present in solid, dissolved or suspended condition.

Thereupon, such plates must be treated in an atmosphere which is enriched with steam or the vapors of inorganic solvents or swelling agents. In this manner, there is achieved a sensitizing of the layers also in this round-about way which cannot be avoided in special cases, due to the nature of the copying layer used or the function-determining materials to be added. As already indicated, the selection of the sensitizing method depends on the nature of the pigments or other substances added. The starting solutions of the materials entering into question for the coating, together with these added pigments, frequently represent very sensitive colloidally-dispersed systems which are easily poisoned by the addition of the sensitizers and can be caused to precipitate or partially coagulate.

Inasmuch as in many cases the added substances bring about a strong light-absorption, a large number of special measures are possibly necessary in connection with the copying, and particularly in connection with the exposure. In order to obtain excellent relief pictures, it is necessary, in each case, that the layers be hardened to the very bottom, i.e. to the surface of the base. Accordingly, the time of exposure, even when using strong copying arc lamps, must, under certain circumstances, be selected relatively long. In this connection, it is frequently disagreeable that the place become relatively strongly heated due to the long time of exposure. Excessive heating, however, in the same manner as the exposure, itself, leads to hardening, i.e. to the coating materials becoming insoluble so that no picture can be developed out of them any more. In order, in this connection, to avoid the injurious action of the heating, the use of special negatives has proven its excellence, in which connection the non-transilluminable surface areas have a metallically-reflecting or white-reflecting surface on the side facing the incident light. The added pigments sometimes effect such an absorption of the light that normal trans-illumination of these layers is scarcely possible. In this case, special types of radiation, such as ultaviolet light or infra-red light or else even X-ray or the radiation emanating from radio-active screens can be successfully used, it being necessary in the latter cases to take negatives, the surface areas of which, which are impermeable to radiation must consist of a metal, preferably lead. A good thorough hardening of difficultly-trans-illuminable copying layers can also be obtained by illuminating the plates from the front and from the rear through two negatives which are mirror images of each other. The pictorial hardening of the layers, i.e. the separation into surface portions which are to be again dissolved out upon the development and portions which are to remain can be also effected by thermal or electric treatment instead of illumination. Thus, for instance, the copying layers can be brought into contact with a preferably metallic relief which represents the picture of the desired circuits or circuit members and was heated to temperatures between 50 and 100° C., in which way there is obtained a useful thermal hardening at the places of contact. In a similar manner, metallic stencils or metallic coatings applied to insulating bases which show the picture of the desired circuits can be placed on the front and rear side of the plates and these stencils can be used as electrodes of a condenser which is to be charged with D.C. voltage or to be connected to a source of low or high frequency A.C. voltage. In this case, the supporting plate, together with the copying layer, forms the dielectric lying between the two plates and a hardening of the layer takes place within the surface parts of the electrode plates which plates are caused to coincide geometrically.

In order to be better able to trans-illuminate the entire layer thickness of the copying layers which have become relatively opaque by the pigmentation with one of the said addition substances, the addition of luminescent or phosphorescent materials, such as for instance the sulfides or silicates of zinc or cadmium, has proven advantageous. The phosphors which are energized at the surface by the incident light in their turn, by the radiations which they themselves send out, energize the phosphors located deeper within the layer and the illumination is thus automatically propagated through the otherwise nontransparent layer. In this connection, the use of socalled luminophors with infra-red effect is particularly advisable. These phosphors hold fast a quantity of energy which has already been imparted them by irradiation with ultra-violet or X-ray light and accumulate it. Only upon repeated irradiation with infra-red rays is this accumulated quantity of light given off. The addition of phosphors can furthermore also be employed as an end in itself in order, for instance, to apply luminescent surfaces or luminescent legends alongside other conductive or dielectric circuit elements. They can also be added within the scope of the present method to produce luminescent scales.

The development of the exposed layers takes place generally by washing or rinsing the plates with the solvents specific for the coating material used in each specific case. In connection with many coating materials, such as gelatin, glue and the like, this developer liquid is hot water while in the case of polyvinyl alcohol, for instance, even cold water will work. Other coating materials, such as chromated shellac emulsion, require alcohol for the developing, while aqueous emulsions of polystyrene and the like, after drying to hard layers, and after illumination, require mixtures of acetone and methyl acetate as developer liquid. The developing process, i.e., the dissolving out of unexposed areas is made considerably more difficult in certain cases by the presence of various pigments. In such case, it is advisable to add to the developer liquid a weak acid or base, depending on the nature of the pigment added. It was possible to obtain very good results in the development of relief pictures which otherwise were difficult to develop by mechanical excitation of the plates and of the developer liquid by sonic generators, it being possible to use in this connection frequencies which are both within the audible range and in the ultrasonic range. An increase in temperature in this connection is also, at times, advisable.

As already stated, the addition substances which are to impart to the image release their functional properties are also added only after the development. This method has already been explained in connection with the silver nitrate impregnation followed by the reducing treatment with phenylhydrazine. In this case, also, many variations are possible. In general, two or more successive impregnations take place in different solutions which react with each other and then produce the desired substances within the picture relief by precipitation, oxidation, reduction or the formation of complexes. In this connection, the one component of the reaction, as already stated, can be added from the very start to the copying layers and only the second reaction component is added at the time of the after-treatment. As impregnating liquids, there enter into question solutions of the most different metal compounds, preferably solutions of silver, copper, iron, nickel, cobalt, lead, tin or other metals. In this connection, of course, several of the said compounds may, if necessary, also be mixed together. After absorption of the metal-salt solutions, the second impregnating treatment will in general be washing in solutions of alkali metal salts in order to bring about the desired precipitations. The after-treatment can, of course, also take place in special gas or vapor compartments as well as in liquids inasmuch as at times it is preferable to have the reactions take place in the dry. Such an after-treatment with gases or vapors is particularly favorable when it is a question of reducing metals from their solutions or obtaining oxide layers or oxide mixtures by oxidation. In this connection, there may be mentioned the reducing treatment in nitrogen, hydrazine vapors, hydrogen or ammonia, in which connection it is particularly advisable to use these gases in activated state. For oxidizing treatment, there enters into question, aside from pure oxygen, predominantly ozone. In these reactions in such gas chambers it may be just as advisable to introduce the plates in completely dry state as, on the other hand, to subject them in moistened and thus swollen state to the action of these gases. Depending on the nature of the material already present in the layer, it must be decided whether reductions or oxidations in the above-described manner in gas chambers or by bathing in the corresponding liquid reagents, such as phenylhydrazine solutions, ammoniacal water, or, in case of oxidation, hydrogen peroxide, peroxy salt solutions or the like is preferred.

As already mentioned, the after-treatment of the relief picture in some cases serves to change material which is already present in the layer. In a few cases, in particular, it is of decisive importance that metals which are present in colloidal distribution are precipitated out in the form of larger conglomerates in order to obtain better conducting connections.

From what has been stated above, it will be clear that upon the absorption of materials in the after-treatment of the relief picture, the fact is utilized that the areas hardened by the illumination retain a certain swelling power which enables them to become fully soaked with the solutions in which they are immersed. The quantity of material (for instance silver nitrate solution) absorbed in this way therefore depends on the swelling power of the layer. There therefore also depends on this the silver content of the layer after the reduction to silver and thus also its conductivity. It follows from this that by change of the exposure times or change of the light intensity, there can be produced as final result layers of different conductivity inasmuch as the swelling power, after all, is dependent on the preceding hardening and therefore on the quantity of light absorbed. This fact can be taken advantage of by using for the illumination negatives the trans-illuminable areas of which have different light permeabilities which are graded with respect to each other or else merge continuously. In this way, for instance, electric lines and resistances of specific resistance values can be produced simultaneously in one copying operation. When precipitating metals within the relief picture, it can easily occur that the metals are precipitated in such fine-colloidal distribution that the particles do not have any conductive connection with one another. It has been found that the presence of extremely fine silver nuclei within the layer lead to precipitations of larger particles and thus improved conductivity. Such a preliminary seeding is effected, for instance, by immersing the plates in dilute solutions of alkali metal salts, followed by a washing out again. In such case, nevertheless, there remains held fast by adsorption, sufficient ions, for instance sulfate ions, in the layer, that upon impregnation in the silver nitrate solution a large number of difficultly soluble silver sulfate particles are produced. Upon the following reduction of the silver nitrate into silver, the silver particles which are produced accumulate predominantly at these seed places and form relatively large silver structures having good conductivity.

In order to obtain metallically-conductive circuits of greater load-carrying capacity, reinforcement by electroplating may follow. For this purpose, it is advisable to subject the completely developed relief picture for a certain period of time to a heat hardening at high temperatures in order to eliminate any remaining swellability of the layers and prevent a penetration of the bath electrolytes.

After final completion of the layers, the plates must be carefully washed in water in order to eliminate any still-remaining ions coming from surplus substances which took part in the preceding reactions. In obstinate cases and when it is of importance to obtain layers which are very clean and absolutely free of ions, for instance for dielectrics or condenser coatings in connection with which the smallest possible high frequency attenuation is desired, the layers should be subjected to a final cleaning by dialysis or electrodialysis.

It is immediately clear that several functional layers or relief pictures of different composition can be copied one above the other on one and the same base in accordance with the method of the invention so as to receive circuits of circuit members in connection with which conductive and insulating functional parts, as well as still other functional parts, are combined with each other. As base there may be used plastic plates or sheets, glass, mica or ceramic plates. When thin plastic sheets are used as base for the layer, for instance sheets of polystyrene, circuit diagrams can be copied one after the other on both sides, in which connection electric capacitive or magnetic couplings through the sheet can be obtained. After final completion of circuits in accordance with one or more procedural steps in accordance with the preceding remarks, they can be coated with a final coating of protective lacquer. In case of necessity, the protective coating can also consist of poured sheets or plates of self-hardening or polymerizable solutions of plastic and after the hardening of these solutions the entire unit, together with the circuits and circuit elements, can be lifted off from the original supporting base, in which connection the requirement must be complied with that the adherence of the relief picture to the poured-on plastic plate is greater than the adherence to the base plate.

We claim:

1. Process of producing a printed circuit product including an insulating base layer and an adherent electrically conductive printed circuit pattern on said insulating base layer, which comprises the steps of applying onto said insulating base layer an adherent water soluble aqueous colloid coating containing a dichromate photosensitizer and adding to said coating a colloidally dispersed suspension of electrically conductive finely divided powdered material of the class consisting of electrically conductive metal and electrically conductive carbon, in amount sufficient to impart electrical conductivity to the coating, exposing the photo-sensitive coating to irradiation through a negative of the desired circuit pattern and thus rendering said coating insoluble in water where irradiated, and forming an electrically conductive adherent circuit pattern on said base layer from the irradiated portion of the photo-sensitive coating by washing away the unexposed portions of said coating from the insulating base layer with water and leaving said irradiated portions adhering to the insulating base layer.

2. Process of producing a printed circuit product including an insulating base layer and an adherent electrically conductive printed circuit pattern on said insulating base layer, which comprises the steps of applying onto said insulating base layer an adherent water soluble aqueous colloid coating containing a dichromate photosensitizer and adding to said coating a colloidally dispersed suspension of electrically conductive finely divided powdered material of the class consisting of electrically conductive metal in amount sufficient to impart electrical conductivity to the coating, exposing the photo-sensitive coating to irradiation through a negative of the desired circuit pattern and thus rendering said coating insoluble in water where irradiated, and forming an electrically conductive adherent circuit pattern on said base layer from the irradiated portion of the photo-sensitive coating by washing away the unexposed portions of said coating from the insulating base layer with water and leaving said irradiated portions adhering to the insulating base layer.

3. Process of producing a printed circuit product including an insulating base layer and an adherent electrically conductive printed circuit pattern on said insulating base layer, which comprises the steps of applying onto said insulating base layer an adherent water soluble aqueous colloid coating containing a dichromate photosensitizer and adding to said coating a colloidally dispersed suspension of electrically conductive finely divided powdered material of the class consisting of electrically conductive carbon in amount sufficient to impart electrical conductivity to the coating, exposing the photo-sensitive coating to irradiation through a negative of the desired circuit pattern and thus rendering said coating insoluble in water where irradiated, and forming an electrically conductive adherent circuit pattern on said base layer from the irradiated portion of the photo-sensitive coating by washing away the unexposed portions of said coating from the insulating base layer with water and leaving said irradiated portions adhering to the insulating base layer.

References Cited in the file of this patent

UNITED STATES PATENTS

| | | |
|---|---|---|
| 36,821 | Poitevin | Oct. 28, 1862 |
| 126,861 | Woodbury | May 14, 1872 |
| 159,104 | Levy | Jan. 26, 1875 |
| 292,181 | Shugg | Jan. 22, 1884 |
| 725,879 | Schmidting | Apr. 21, 1903 |
| 1,609,091 | Miller | Nov. 30, 1926 |
| 1,692,528 | Wieland | Nov. 20, 1928 |
| 2,061,230 | Frankenburger et al. | Nov. 17, 1936 |
| 2,100,063 | Zahn | Nov. 23, 1937 |
| 2,536,383 | Mears et al. | Jan. 2, 1951 |
| 2,596,756 | Yutzy et al. | May 13, 1952 |
| 2,600,343 | Tuttle | June 10, 1952 |
| 2,721,822 | Pritikin | Oct. 25, 1955 |
| 2,776,235 | Peck | Jan. 1, 1957 |

FOREIGN PATENTS

| | | |
|---|---|---|
| 1,299 | Great Britain | of 1860 |
| 449 | Great Britain | of 1866 |